United States Patent
Ishida

(10) Patent No.: US 9,505,460 B2
(45) Date of Patent: Nov. 29, 2016

(54) SADDLE-RIDE TYPE VEHICLE

(71) Applicant: HONDA MOTOR CO., LTD., Tokyo (JP)

(72) Inventor: Shinichiro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/940,075

(22) Filed: Nov. 12, 2015

(65) Prior Publication Data

US 2016/0244119 A1 Aug. 25, 2016

(30) Foreign Application Priority Data

Sep. 30, 2014 (JP) .................................. 2014-201175

(51) Int. Cl.
*B62K 11/04* (2006.01)
*B62M 7/04* (2006.01)
*B62K 25/28* (2006.01)

(52) U.S. Cl.
CPC ............. *B62K 11/04* (2013.01); *B62K 25/283* (2013.01); *B62M 7/04* (2013.01)

(58) Field of Classification Search
CPC ...... B62K 11/02; B62K 11/04; B62K 25/283
See application file for complete search history.

(56) References Cited

U.S. PATENT DOCUMENTS

| | | | | |
|---|---|---|---|---|
| 4,756,380 A | * | 7/1988 | Uehara .................. | B60K 11/00 180/227 |
| 8,602,152 B2 | * | 12/2013 | Kashiwai ............... | B62K 11/02 180/300 |
| 2010/0207345 A1 | * | 8/2010 | Nakagawa ........... | B62K 25/283 280/124.109 |
| 2013/0264795 A1 | * | 10/2013 | Sugiyama ............ | B62K 25/283 280/281.1 |
| 2014/0361512 A1 | * | 12/2014 | Ishida .................... | B62K 25/20 280/284 |

FOREIGN PATENT DOCUMENTS

JP 2012-166657 A 9/2012

* cited by examiner

*Primary Examiner* — Kevin Hurley
(74) *Attorney, Agent, or Firm* — Birch, Stewart, Kolasch & Birch, LLP

(57) ABSTRACT

A saddle-ride type vehicle which includes a rear suspension supporting portion disposed on a cross member of a body frame, and an engine supported on the body frame, wherein the load transmission between the front and rear of the body frame is suppressed while mass concentration is achieved. The saddle-ride type vehicle supports a shock absorber upper end coupling portion on the cross member coupling left and right pivot frames, and supports the engine E below main frames forwardly of the pivot frames. The cross member is disposed closer to the seat rail coupling portions between upper rear portions of the left and right pivot frames. The shock absorber upper end coupling portion is provided at a leading end portion of a shock absorber support bracket extending forwardly and downwardly from the cross member.

20 Claims, 12 Drawing Sheets

SADDLE-RIDE TYPE VEHICLE

CROSS-REFERENCE TO RELATED APPLICATIONS

The present application claims priority under 35 USC 119 to Japanese Patent Application No. 2014-201175 filed Sep. 30, 2014 the entire contents of which are hereby incorporated by reference.

BACKGROUND OF THE INVENTION

1. Field of the Invention

The present invention relates to a saddle-ride type vehicle.

2. Description of Background Art

A structure is known wherein left and right main frames extend rearwardly from a head pipe of a body frame with left and right pivot frames coupled to rear ends of the left and right main frames and extending downwardly. A cross member is coupled to upper portions of the left and right pivot frames with a rear suspension supporting portion supported on the cross member and an engine supported on the body frame. See, for example, JP-A No. 2012-166657.

However, in the above-described structure, there is a problem in that, since the rear suspension supporting portion is disposed in the rear of the cross member, the engine and the rear suspension, which are heavy objects, become separated from each other, and mass dispersion is likely to occur.

SUMMARY AND OBJECTS OF THE INVENTION

Accordingly, an object of an embodiment of the present invention is to provide a saddle-ride type vehicle which includes a rear suspension supporting portion supported on a cross member of a body frame, and an engine supported on the body frame, wherein mass concentration is achieved and the load transmission between the front and rear of the body frame is suppressed.

According to an embodiment of the present invention, saddle-ride type vehicle (1) is provided with a body frame (10) including a head pipe (11); left and right main frames (12) that extend rearwardly from the head pipe (11); left and right pivot frames (13) that are coupled to rear ends of the left and right main frames (12) and extend downwardly for swingably supporting a swing arm (4), the swing arm (4) supporting a rear wheel (5); a cross member (18) that couples the left and right pivot frames (13); and left and right seat rails (14) that extend rearwardly from upper portions of the left and right pivot frames (13) for supporting seats (26, 27). The saddle-ride type vehicle (1) supports a rear suspension upper support portion (18d) on the cross member (18) and supports an engine (E) below the main frames (12) forwardly of the pivot frames (13). Each of the pivot frames (13) has a seat rail coupling portion (13b) at an upper rear portion thereof while having a main frame coupling portion (13a) at an upper front portion thereof. The cross member (18) is disposed adjacent to the seat rail coupling portions (13b) between upper rear portions of the left and right pivot frames (13). The rear suspension upper support portion (18d) is provided at a leading end portion of a bracket (18c) extending forwardly and downwardly from the cross member (18).

It should be noted that examples of the saddle-ride type vehicle include general vehicles in which a rider sits astride a vehicle body, and include not only motorcycles (including motor-assisted bicycles and scooter-type vehicles), but also three-wheeled vehicles (including vehicles having one wheel in front and two in the rear, as well as vehicles having two wheels in front and one in the rear) or four-wheeled vehicles.

According to an embodiment of the present invention, the body frame (10) is provided with a narrowed portion (10c) between a maximum width portion (12c) between the left and right main frames (12) and a maximum width portion (14c) between the left and right seat rails (14) in a plan view, and the cross member (18) couples the left and right pivot frames (13) at the narrowed portion (10c).

According to an embodiment of the present invention, the cross member (18), in a side view, is disposed above a line segment (12d), the line segment (12d) passing through the center of a main-frame width direction perpendicular to a longitudinal direction of the main frames 12.

According to an embodiment of the present invention, an auxiliary machine arrangement box (28) is provided above a forwardly-inclined rear shock absorber (31) rearwardly of the cross member (18).

According to an embodiment of the present invention, each of the pivot frames (13) is provided with an opening portion (13c), the opening portion (13c) being located forward of and below the cross member (18) and passing therethrough in the vehicle width direction, and, in a side view, the rear suspension upper support portion (18d) is disposed inside the opening portion (13c).

According to an embodiment of the present invention, the rear suspension upper support portion is disposed forward of and below the cross member. Thus, while the rear suspension is brought closer to the engine located forward of the pivot frame, the upper height of the rear suspension is reduced, thereby allowing mass concentration.

Furthermore, the cross member supporting the rear suspension upper support portion while coupling the left and right pivot frames is disposed close to the seat rail coupling portions, thereby separating the cross member from the main frame coupling portions. Thus, the load transmitted from the front wheel to the head pipe is absorbed by the deformation of the main frames and the large portions of the pivot frames which serve as the main frame coupling portions, thereby dispersing the stress caused by the load from the front wheel and enabling the transmission of load to the rear wheel to be minimized.

Further, the loads applied to the seat rails from an occupant and on-vehicle objects are received by the cross member spaced apart from the main frame coupling portions, thereby making it less likely that loads on the seat rails are transmitted to the main frames, and enabling the transmission of load to the front wheel to be minimized.

According to an embodiment of the present invention, at the narrowed portion, the left and right pivot frames are coupled by the cross member. Thus, the cross member is shortened to minimize its deflection, thereby allowing an increase in the rigidity around the cross member. Especially since the load from the rear suspension is received by the cross member that is less likely to be deflected, it is possible to make the load from the rear suspension less likely to be transmitted to the main frames. Moreover, the narrowed portion of the body frame is located forward of the seat rails, thereby allowing improved occupant comfort.

According to an embodiment of the present invention, the cross member is disposed so as to avoid the center of the main-frame width direction in a side view, thereby allowing an improvement in the deformation of the main frame and the main frame coupling portion. Especially since the cross member is disposed at a position above the center of the main-frame width direction, it is possible to make the lower portions of the main frames likely to be deflected, and to excellently disperse the load of the engine supported below the main frames.

According to an embodiment of the present invention, the space formed at the rear of the cross member by inclining the rear shock absorber forward can be effectively used as the auxiliary machine arrangement portion for arranging auxiliary machines, such as electric components.

According to an embodiment of the present invention, it is possible to provide access from the outside in the vehicle width direction to rear suspension upper support portion through the opening portion of the pivot frame, resulting in an improvement in the assemblability of the rear suspension. It is also possible to ensure the rigidity of the pivot frames by disposing the cross member close to the opening portions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
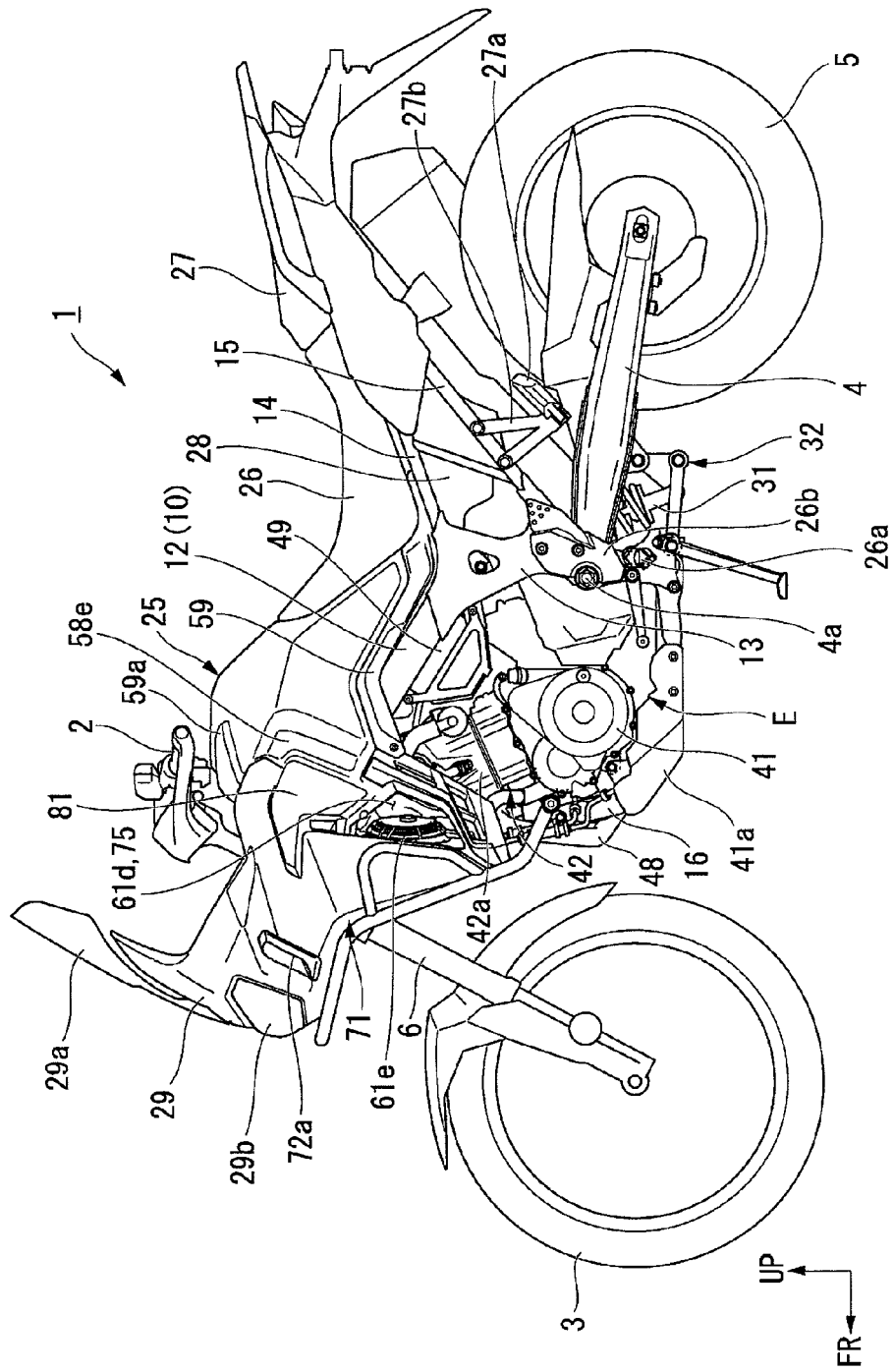
FIG. 1 is a left side view of a motorcycle according to an embodiment of the present invention.

Hereinafter, an embodiment of the present invention will be described with reference to the accompanying drawings. It is to be noted that, in the following description, references to directions, such as front, rear, left, and right, are made with reference to a vehicle to be described below, unless otherwise stated. It is also to be noted that, in the drawings used in the following description, arrow FR indicating the front of the vehicle, arrow LH indicating the left of the vehicle, and arrow UP indicating the upper side of the vehicle are shown in position. It is also to be noted that the vehicle to be described below is of symmetrical configuration with respect to the vehicle body left-right centerline CL shown in position in the drawings, unless otherwise stated.

As shown in FIG. 1, a motorcycle 1 according to this embodiment is equipped with an engine E fixed to a body frame 10 between a front wheel 3 steered by a steering handlebar 2 and a rear wheel 5 supported at a rear end of a swing arm 4.

Figure 7:
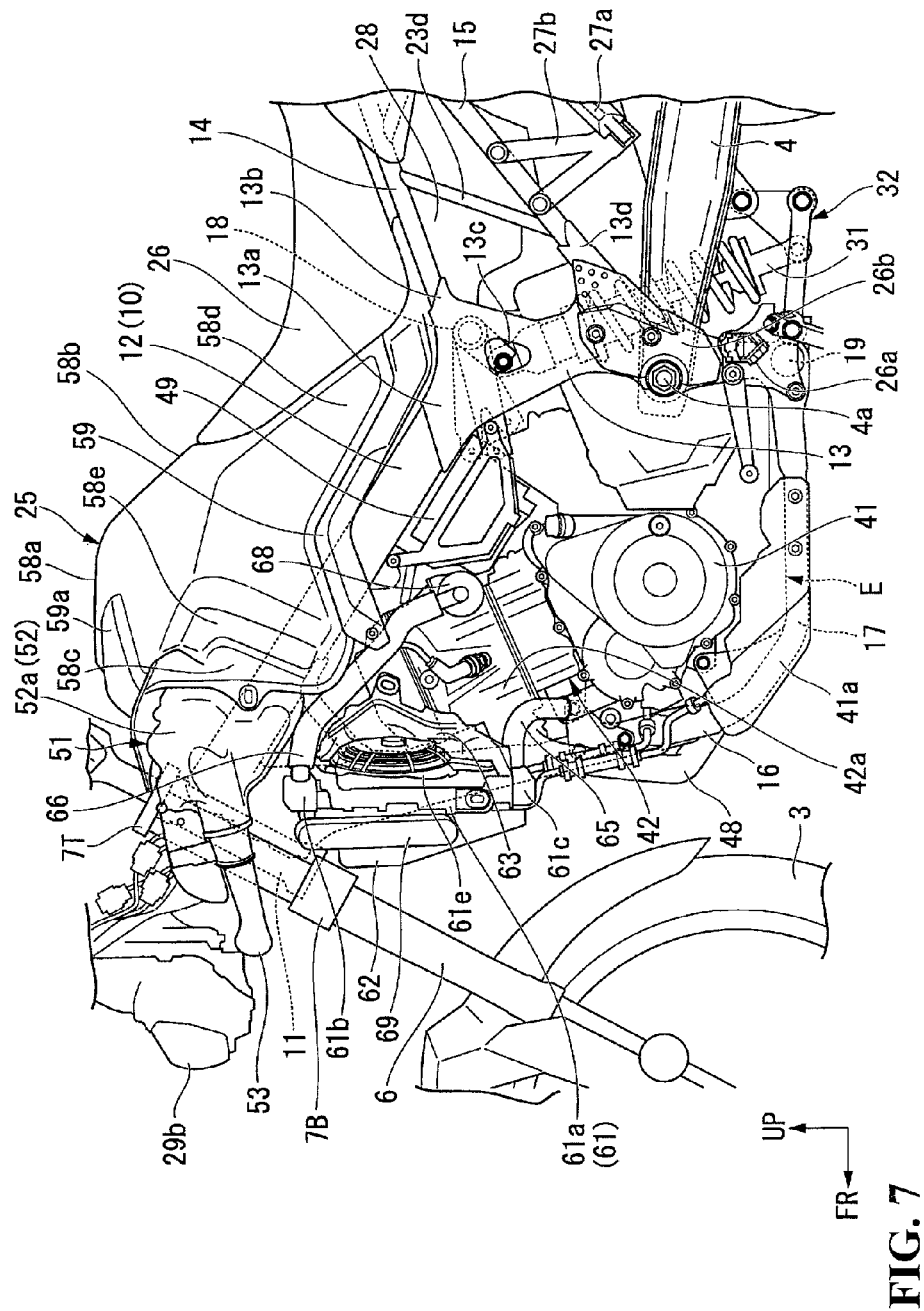
FIG. 7 is a left side view without the radiator shroud.

Referring additionally to FIG. 7, a front-wheel suspension system including the steering handlebar 2 is steerably pivotally supported by a head pipe 11 located at a front end of the body frame 10. A rear-wheel suspension system including the swing arm 4 is swingably pivotally supported by left and right pivot frames 13 located at a longitudinal intermediate portion of the body frame 10. The motorcycle 1 is an off-road vehicle having a large amount of wheel vertical stroke.

A fuel tank 25 is disposed above the engine E. A rider seat 26 is disposed at the rear of the fuel tank 25, and a pillion passenger seat 27 is disposed at the rear of the rider seat 26. A front cowl 29 is mounted in the front of the vehicle body so as to cover the range from the front to the left and right sides of the head pipe 11. An upwardly-extending windshield 29a is mounted on an upper portion of the front cowl 29. A headlight 29b having left and right two lamps is disposed inside a front end of the front cowl 29.

The front-wheel suspension system is provided with left and right front forks 6 with the front wheel 3 journaled to lower ends thereof; a top bridge 7T and a bottom bridge 7B that are provided so as to extend between upper portions of the left and right front forks 6; a steering shaft (not shown) that is provided so as to extend between the top bridge 7T and the bottom bridge 7B, and inserted into the head pipe 11; and the steering handlebar 2 that is supported on the top bridge 7T.

The rear-wheel steering system is provided with the swing arm 4 with the rear wheel 5 journaled to rear ends of left and right arms thereof; a linkage mechanism 32 that extends between a front portion of the swing arm 4 and lower portions of the left and right pivot frames 13; and a rear shock absorber 31 that extends between the linkage mechanism 32 and upper portions of the left and right pivot frames 13. A front end of the swing arm 4 is supported by vertical intermediate portions of the left and right pivot frames 13 with a pivot shaft 4a therebetween.

Figure 2:
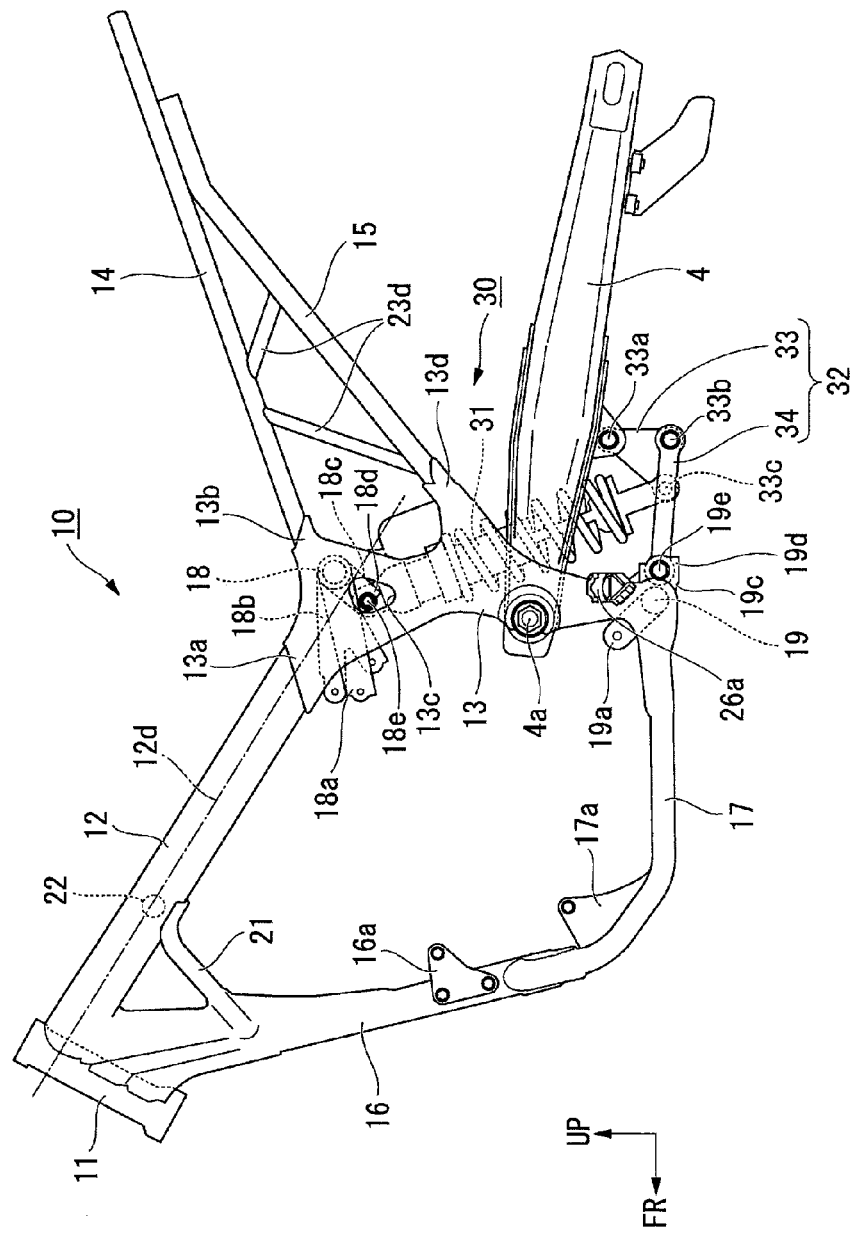
FIG. 2 is a left side view of a body frame and a rear suspension of the motorcycle.
Figure 3:
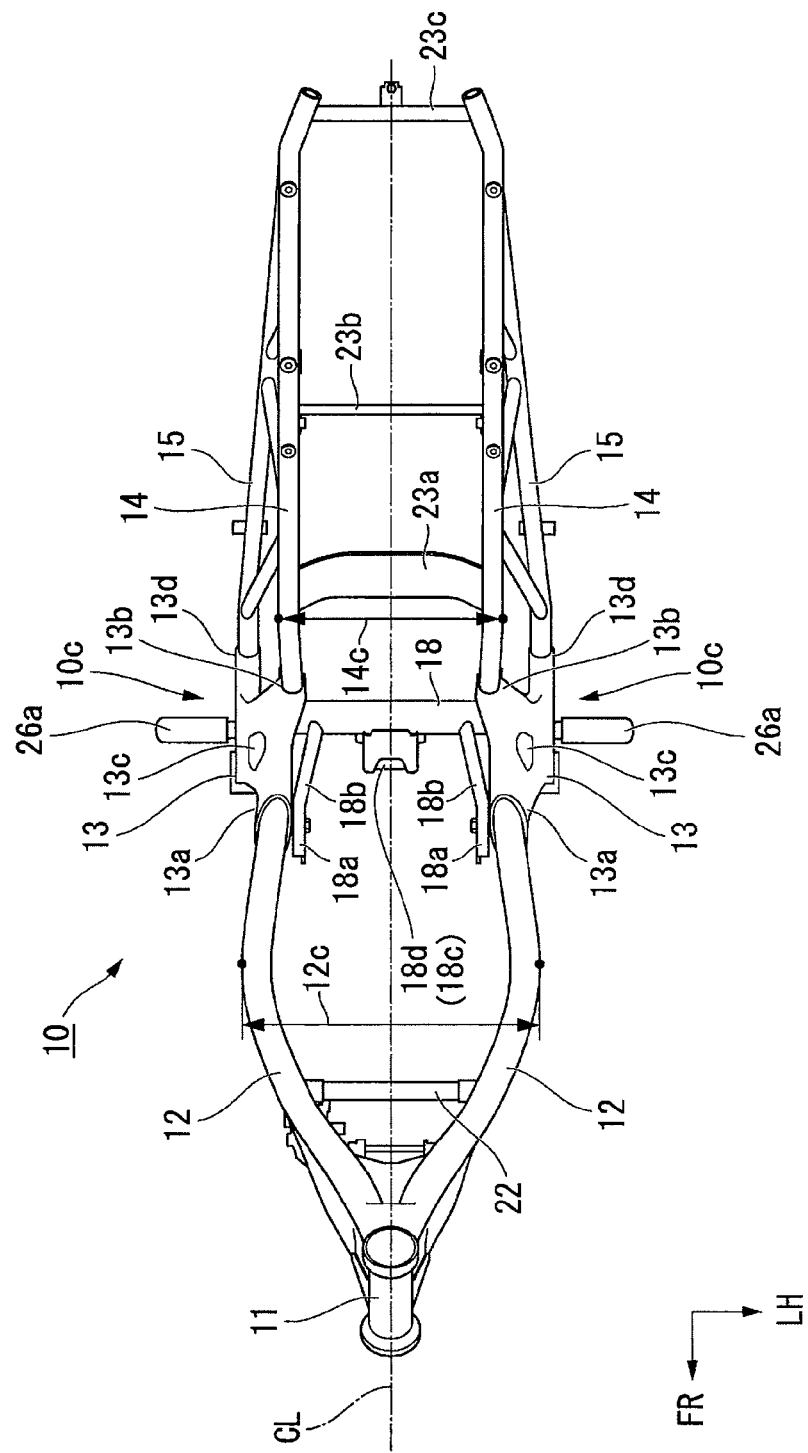
FIG. 3 is a top view of the body frame.

As shown in FIGS. 2 and 3, the body frame 10 is formed by integrally joining, by welding or the like, a plurality of various kinds of steel. The body frame 10 is provided with the head pipe 11; left and right main frames 12 that branch into left and right from an upper portion of the head pipe 11 to extend rearwardly and downwardly; left and right pivot frames 13 that extend downwardly from rear ends of the left and right main frames 12; left and right seat rails 14 that extend rearwardly and upwardly from upper ends of the left and right pivot frames 13; left and right sub-frames 15 that extend rearwardly and upwardly from lower portions of the left and right pivot frames 13 below the left and right seat rails 14 to be coupled to the left and right seat rails 14; a single down frame 16 that extends downwardly from a lower portion of the head pipe 11; and left and right lower frames 17 that branch left and right from a lower end of the down frame 16 and extend rearward to be coupled to lower ends of the left and right pivot frames 13.

Referring also to FIG. 7, the body frame 10 is equipped with the engine E forwardly of the left and right pivot frames 13 below the left and right main frames 12 located at the rear of the head pipe 11, and is a semi-double cradle type frame in which the engine E is surrounded from the front and below by the single down frame 16 and the left and right lower frames 17. Upper portions of the left and right pivot frames 13 are coupled by a cross member 18, and lower portions of the left and right pivot frames 13 are coupled by a lower cross member 19.

The engine E is supported fixedly on the body frame 10 by a plurality of engine supporting portions provided in position on the body frame 10.

More specifically, in the engine E, a front end of a cylinder portion 42 is supported by a lower portion of the down frame 16 with a front upper mount bracket 16a therebetween; a front end of a crankcase 41 is supported by front portions of the left and right lower frames 17 with a front lower mount bracket 17a therebetween; the upper side of a rear end of the crankcase 41 is supported by the cross member 18 with a rear upper mount bracket 18a therebetween; and the lower side of a rear end of the crankcase 41 is supported by the lower cross member 19 with a rear lower mount bracket 19a therebetween.

Figure 4:
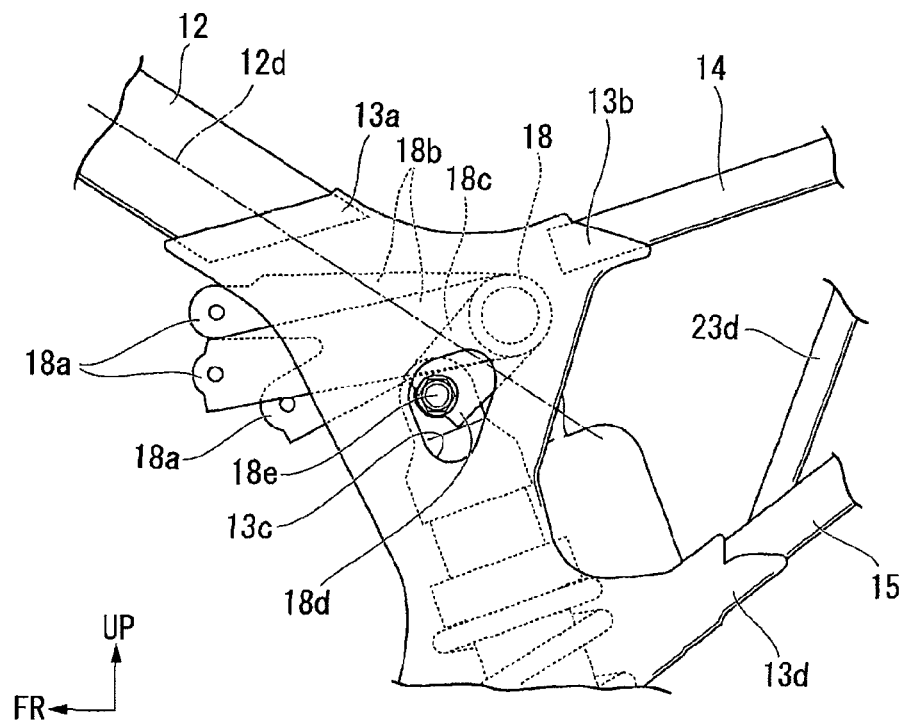
FIG. 4 is a left side view of the periphery of a pivot frame of the body frame.
Figure 5:
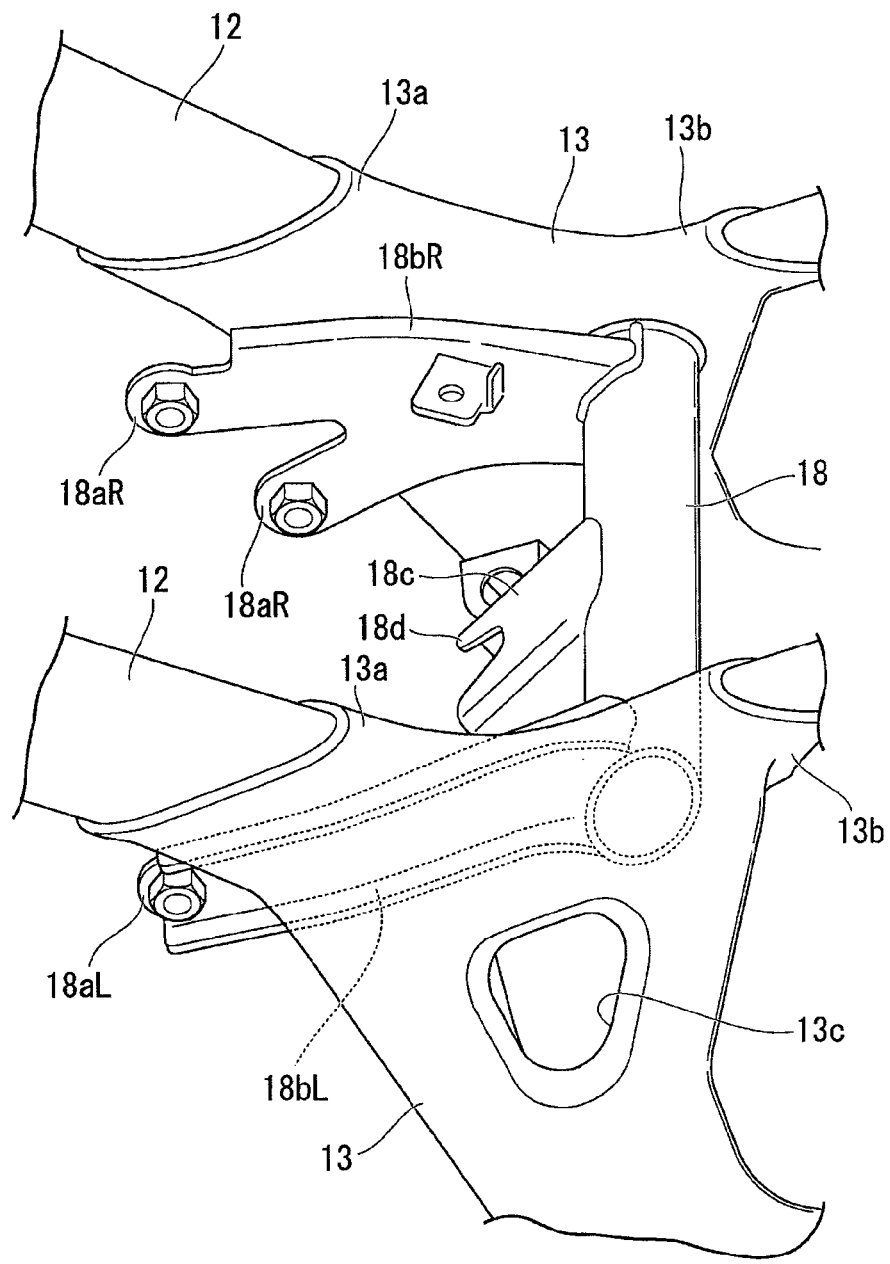
FIG. 5 is a perspective view of the periphery of the pivot frames as viewed from the upper left.

As shown in FIGS. 4 and 5, the rear upper mount bracket 18a is provided at leading ends of left and right mount arms 18b that extend forwardly from left and right side portions of the cross member 18. The left and right mount arms 18b are represented as left and right mount arms 18bL and 18bR which are asymmetrical with respect to each other. The rear upper mount bracket 18a is represented as rear upper mount brackets 18aL and 18aR which are provided at the leading ends, respectively, of the left and right mount arms 18bL and 18bR. For example, the right-hand rear upper mount bracket 18aR is formed in a forked shape.

The rear upper mount bracket 18a supports the engine E at a location further from the frame members of the body frame 10 than the other mount brackets 16a, 17a, and 19a. While the periphery of the cross member 18 coupling the upper portions of the left and right pivot frames 13 has high rigidity, the relatively-long left and right mount arms 18b are interposed between this portion and the engine E, thereby imparting a liveliness to the movement of the vehicle body without inhibiting the displacement of the periphery of the cross member 18 relative to the heavy engine E.

Referring to FIGS. 2 and 3, left and right gusset members 21 extending between front portions of the left and right main frames 12 and an upper portion of the down frame 16 are provided behind and below the head pipe 11.

Figure 12:
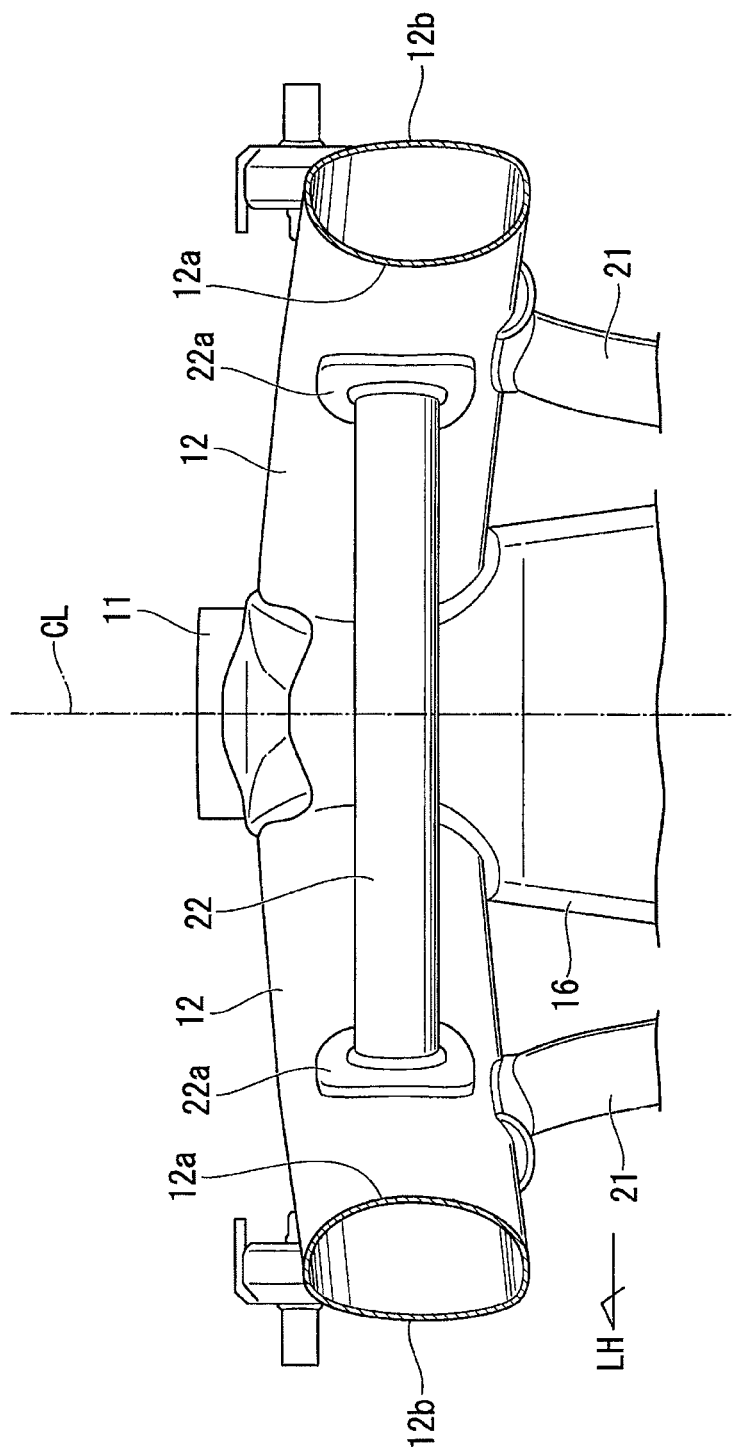
FIG. 12 is a perspective view of the periphery of a head pipe as viewed from behind so as to follow the main frames

FIG. 12 shows the periphery of the cross member 22 stretched between front portions of the left and right main frames 12 in the vicinity of upper ends of the left and right gusset members 21. Each of the main frames 12 is of vertically-long hollow oval shape in cross section intersecting with the longitudinal direction thereof. More specifically, the main frame 12, in the above-described cross section, has an inner wall 12a in the form of a circular arc protruding inwardly in the vehicle width direction, and an outer wall 12b formed flatter than the inner wall 12a and extending vertically. Left and right ends of the cross member 22 are coupled to the inner walls 12a of the left and right main frames 12 with patch members 22a therebetween.

Between the left and right seat rails 14, a front seat cross frame 23a, an intermediate seat cross frame 23b, and a rear seat cross frame 23c, are stretched in order from the front. A plurality of inclined frames 23d coupling the seat rail 14 and the sub-frame 15 in a truss in a side view on each side are stretched between the seat rail 14 and the sub-frame 15.

Referring to FIG. 3, the left and right main frames 12, in plan view (top view), extend rearwardly while curving so as to bulge outwardly in the vehicle width direction at the rear of the head pipe 11. Hereinafter, the portion where the distance between the left and right main frames 12 becomes maximum is referred to as a between-main-frame maximum width portion 12c.

The left and right seat rails 14, in plan view, extend so as to be inclined slightly outwardly in the vehicle width direction at the rear of the left and right pivot frames 13, and then extend rearwardly along the longitudinal direction. Hereinafter, the portion where the distance between the left and right seat rails 14 becomes maximum is referred to as a between-seat-rail maximum width portion 14c.

The body frame 10 forms a narrowed portion 10c between the between-main-frame maximum width portion 12c and the between-seat-rail maximum width portion 14c (between the upper portions of the left and right pivot frames 13), the narrowed portion 10c being narrower than both maximum width portions 12c and 14c.

On the narrowed portion 10c, the cross member 18 is stretched between the upper portions of the left and right pivot frames 13. Steps 26a for an occupant (rider) sitting in the rider seat 26 are disposed vertically below the narrowed portion 10c (vertically below the cross member 18). Thus, since the occupant's leg passes across the vicinity of the narrowed portion 10c, the occupant comfort and the foot grounding property are improved. Furthermore, the length of the cross member 18 is shortened to suppress deflection, thereby making loads and vibrations on the seat rails 14 less likely to be transmitted to the main frames 12.

Referring to FIGS. 1 and 7, a frame cover 26b for covering the outer surface of the pivot frame 13 is mounted above the step 26a. On the sub-frame 15, a step 27a for an occupant (pillion passenger) sitting in the pillion passenger seat 27 is supported with a step bracket 27b therebetween.

Referring to FIGS. 2 and 4, an upper portion of the pivot frame 13 has approximately the shape of an inverted triangle in a side view, a front upper portion thereof serving as a main frame coupling portion 13a, and a rear upper portion thereof serving as a seat rail coupling portion 13b. A central portion of the upper portion of the pivot frame 13 is formed with an opening portion 13c passing therethrough in the vehicle width direction. The cross member 18 is disposed between the opening portion 13c of the pivot frame 13 and the seat rail coupling portion 13b. A sub-frame coupling portion 13d extending upwardly and rearwardly is formed at a rear portion of the pivot frame 13.

A line segment 12d along the longitudinal direction of the main frame 12 as shown in FIGS. 2 and 4 is a line segment which passes through the center of a main-frame width direction perpendicular to the longitudinal direction of the main frame 12 in a side view. The cross member 18, in a side view, is disposed above an extension to the rear of the line segment 12d. Thus, since the cross member 18 is disposed in such a manner so as to avoid the center of the main-frame width direction, the main frame 12 and the main frame coupling portion 13a become more likely to deflect than the case where the cross member 18 is disposed at the center of the main-frame width direction. Furthermore, by the upward movement of the cross member 18, the space below the cross member 18 is increased and the shock absorber 31 is easily disposed.

Referring to FIGS. 3 and 5, a shock absorber support bracket 18c extending forwardly and downwardly is fixedly provided at a horizontal central portion of the cross member 18. The shock absorber support bracket 18c forms a shock absorber upper end coupling portion 18d at a leading end portion thereof. That is, the shock absorber upper end coupling portion 18d is disposed at a distance forward of and below the cross member 18. Thus, while the rear shock absorber 31 is brought closer to the engine E to achieve mass concentration, the cross member 18 is brought closer to the seat rails 14 to also support the loads on the seat rails 14, thereby making it less likely that loads, vibrations, etc. on the seat rails 14 side are transmitted to the main frames 12 side. Furthermore, the rear shock absorber 31 is inclined forward, thereby allowing securing a component arrangement space above and behind the rear shock absorber 31. An auxiliary machine arrangement box 28 is provided in this space, in which various electric components (an ABS modulator, canister, ETC unit, etc.) are stored. In an off-road vehicle, many components are arranged in the upper space of the forwardly-inclined rear shock absorber 31, thereby allowing a reduction in the height of the rider seat 26 and the pillion passenger seat 27 while ensuring an oscillating range of the rear wheel 5.

Referring to FIG. 2, the rear suspension 30, serving as the rear wheel suspension system, is provided with the swing arm 4, the linkage mechanism 32, and the rear shock absorber 31, and configured such that the front end of the swing arm 4 is coupled to the vertical intermediate portions of the left and right pivot frames 13 with the pivot shaft 4a therebetween, and an upper end of the rear shock absorber 31 is coupled to the shock absorber upper end coupling portion 18d with a turning shaft 18e therebetween.

The linkage mechanism 32 has a linkage member 33 of triangular shape in a side view which has an upper end coupled to a lower front portion of the swing arm 4 with a turning shaft 33a therebetween; and a linkage arm 34 that has a rear end coupled to a rear lower portion of the linkage member 33 with a turning shaft 33b therebetween, and a front end coupled to a linkage front end coupling portion 19d, which is located at a lower end of the pivot frame 13, with a turning shaft 19e therebetween. A lower end of the rear shock absorber 31 is coupled to a front lower portion of the linkage member 33 with a turning shaft 33c therebetween. Each of the turning shafts 18e, 19e, 33a, 33b, and 33c is a shaft that extends along the horizontal direction in the same manner as the pivot shaft 4a, and configured from, for example, a shaft portion of a shoulder bolt.

The rear shock absorber 31 has approximately a cylindrical outer shape and extends vertically along the direction of the forwardly-inclined axis (longitudinal direction). The shock absorber upper end coupling portion 18d supporting the upper end of the rear shock absorber 31 is located inward of the opening portion 13c of the pivot frame 13 in a side view. More specifically, the shock absorber upper end coupling portion 18d is exposed on the outside in the vehicle width direction through the opening portion 13c and designed to detachably mount a tool through the opening portion 13c. Thus, work, such as fastening to the rear shock absorber supporting portion (turning shaft 18e), can be performed through the opening portion 13c, resulting in an improvement in working efficiency, such as attaching/detaching of the rear shock absorber 31.

The auxiliary machine arrangement box 28 is provided above and behind the rear shock absorber 31 below the rider seat 26. The ABS modulator, canister, ETC unit and the like as electric components are stored in the auxiliary machine arrangement box 28. The auxiliary machine arrangement box 28 allows access to the electric components from above, for example by removal of the rider seat 26.

Figure 11:
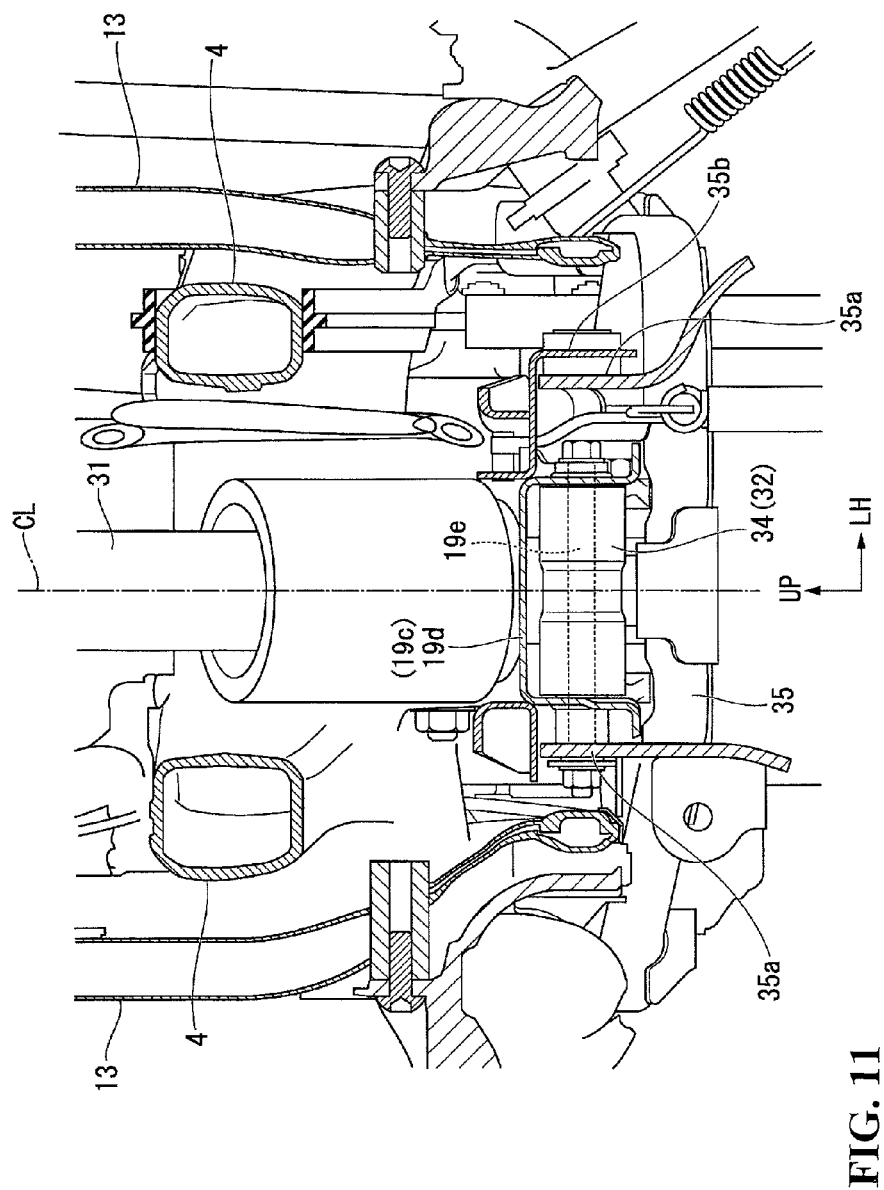
FIG. 11 is a sectional view of a cross section perpendicular to the longitudinal direction in the periphery of a lower cross member as viewed from the front.

Referring to FIGS. 1 and 11, a linkage support bracket 19c is fixedly provided on the lower cross member 19 located at the lower portions of the pivot frames 13. The linkage support bracket 19c forms the linkage front end coupling portion 19d for coupling a front end of the linkage arm 34. The front end of the linkage arm 34 is provided in a cylindrical shape extending between front ends of left and right arm bodies.

Left and right base end portions 35a of a main stand 35 of the motorcycle are turnably supported by the linkage support bracket 19c and a stand support bracket 35b adjacent to the linkage support bracket 19c. The main stand 35 can be turned between a use position, where it extends downwardly from the left and right base end portions 35a and supports the vehicle body upright, and a storage position, where it extends rearwardly from the left and right base end portions 35a and separates from the ground. The left and right base end portions 35a of the main stand 35 are supported coaxially with the front end of the linkage arm 34 by the linkage support bracket 19c and the stand support bracket 35b.

Referring to FIGS. 1 and 7, the engine E is installed below the left and right main frames 12 forwardly of the left and right pivot frames 13. The engine E is provided with a crankcase 41 that houses a crankshaft and a transmission integrally, and the cylinder portion 42 that is erected upwardly and forwardly from the front of the top face of the crankcase 41. The engine E is, for example, a parallel twin cylinder engine, in which two cylinders are formed side by side in the horizontal direction (vehicle width direction) within the cylinder portion 42.

An intake passage including a throttle body (not shown) is connected to the rear of a cylinder head 42a of the cylinder portion 42. An exhaust pipe 48 for each cylinder is connected to the front of the cylinder head 42a. The exhaust pipes 48 are bent to extend downward at the front of the cylinder portion 42, and then curved rearward and routed below the crankcase 41 to join together, and thereafter connected to a silencer 48a that is disposed on the right side of a rear portion of the vehicle body. The crankcase 41 and the exhaust pipes 48 are covered with an undercover 41a from below. A battery 49 is disposed at a portion to the rear of the cylinder portion 42 and above the crankcase 41, and, in a side view, at a portion surrounded by the cylinder portion 42, the main frame 12, the pivot frame 13, and the crankcase 41.

Figure 9:
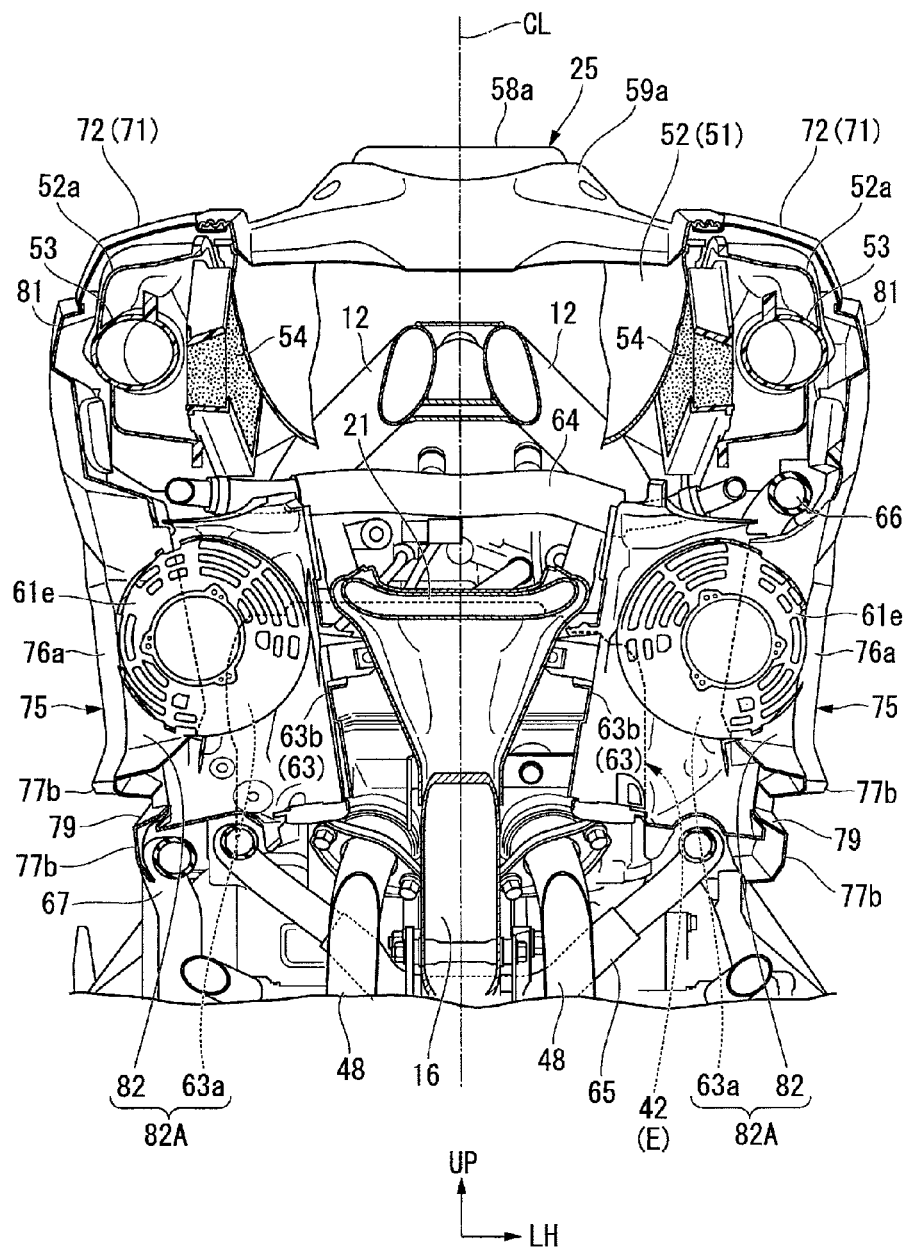
FIG. 9 is a sectional view taken along line IX of FIG. 6.
Figure 10:
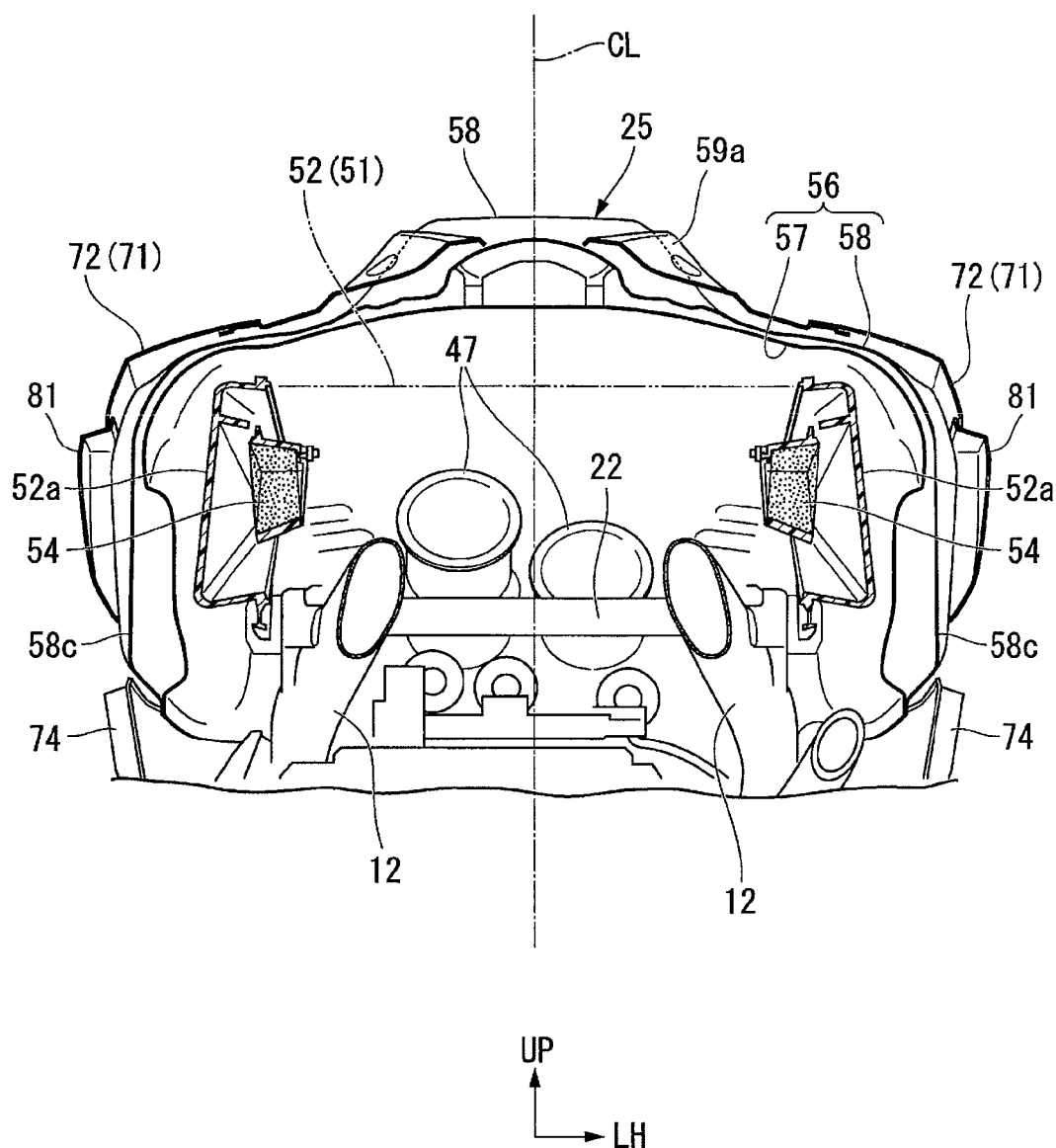
FIG. 10 is a sectional view taken along line X of FIG. 6.

Referring to FIGS. 7, 9, and 10, an air cleaner 51 connected to an upstream end of the intake passage is disposed between an upper portion of the head pipe 11 and a front portion of the fuel tank 25. The air cleaner 51 is provided so as to extend horizontally between front portions of the left and right main frames 12. The air cleaner 51 has an air cleaner case 52 that forms its appearance, and left and right intake ducts 53 that are curved to extend forwardly from left and right side portions 52a of the air cleaner case 52 and open forward.

The left and right side portions 52a of the air cleaner case 52 overhang more outwardly in the vehicle width direction than the left and right main frames 12. The left and right side portions 52a of the air cleaner case 52 extend forwardly and downwardly on the outer side in the vehicle width direction than the left and right main frames 12 so as to overlap the left and right main frames 12 in a side view. The left and right side portions 52a of the air cleaner case 52 are detachably mounted together with the left and right intake ducts 53. An air cleaner element 54 is held within each of the left and right side portions 52a of the air cleaner case 52. Left and right funnels 47 serving as the upstream ends of the intake passages of the cylinders are unsymmetrically supported by rear wall portions of the air cleaner case 52.

Referring to FIG. 10, the fuel tank 25 has a steel tank bottom plate 57 that faces the tank lower side, and a steel tank outer plate 58 that covers a space above the tank bottom plate 57. Joining flanges are continuously provided on outer peripheral edges of the tank bottom plate 57 and the tank outer plate 58, and integrally joined so as to overlap each other to form a hollow tank body 56.

Referring additionally to FIG. 7, the tank outer plate 58 forming the appearance of the tank body 56 has a top portion 58a that forms an approximately-horizontal filler opening mounting surface above the head pipe 11 and the air cleaner case 52; a rearwardly and downwardly inclined portion 58b that is inclined to extend rearwardly and downwardly at the rear of the top portion 58a; left and right overhang portions 58c that extend downwardly on both left and right sides of the top portion 58a and overhang more outwardly in the vehicle width direction than the left and right main frames 12; and knee grip portions 58d that, at the rear of the left and right overhang portions 58c, are each gradually narrowed down to the same horizontal width as that of the left and right main frames 12.

The left and right overhang portions 58c extend downwardly so as to overlap front portions of the main frames 12 in a side view. Between the left and right overhang portions 58c, the tank bottom plate 57 is formed in a saddle shape so as to straddle the main frames 12 and the air cleaner 51. The left and right overhang portions 58c overhang more outwardly in the vehicle width direction than the left and right side portions 52a of the air cleaner 51. Moldings 59 for concealing the joining flanges of the tank body 56 are mounted below the knee grip portions 58d. A tank upper cover 54a is mounted on the periphery of the top portion 58a. A front portion of the rider seat 26 rides, from above and behind, on a rear portion of the rearwardly and downwardly inclined portion 58b.

Figure 8:
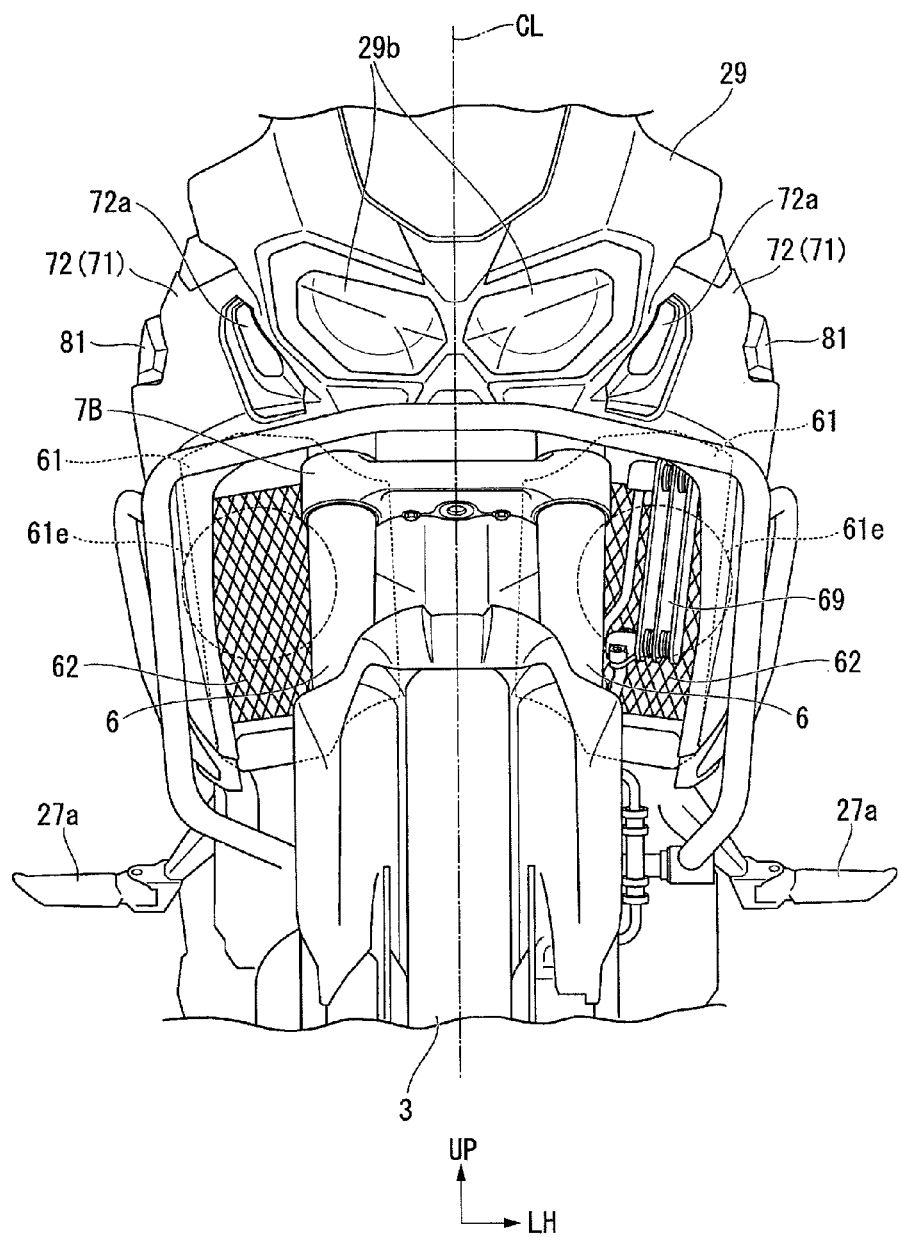
FIG. 8 is a front view of the motorcycle.

Referring to FIGS. 7 and 8, left and right radiators 61 are arranged on the left and right sides of the down frame 16. The left and right radiators 61 are each formed in a thick plate shape and disposed upright in intersecting relation to the vehicle longitudinal direction. The left and right radiators 61 are arranged to be inclined so as to be positioned forward toward the outer side in the vehicle width direction. Each of the left and right radiators 61, in a front view, is formed in a trapezoidal shape in which side portions on the inside and outside in the vehicle width direction are opposite sides almost parallel to each other and the side portion on the outside in the vehicle width direction is set longer than the side portion on the inside in the vehicle width direction. In each of the left and right radiators 61, the side portion on the inside in the vehicle width direction is supported by the outer surface of the down frame 16, and the side portion on the outside in the vehicle width direction is supported by the inner surface of a radiator shroud 71.

In each of the left and right radiators 61, upper and lower horizontally-long tanks 61b and 61c are fixedly provided on upper and lower portions of a radiator core 61a so as to follow the upper and lower inclined sides, respectively, of the trapezoidal shape. A mesh radiator grille 62 is disposed at the front of the radiator core 61a, and a radiator air guide plate 63 is disposed at the rear of the radiator core 61a.

Figure 6:
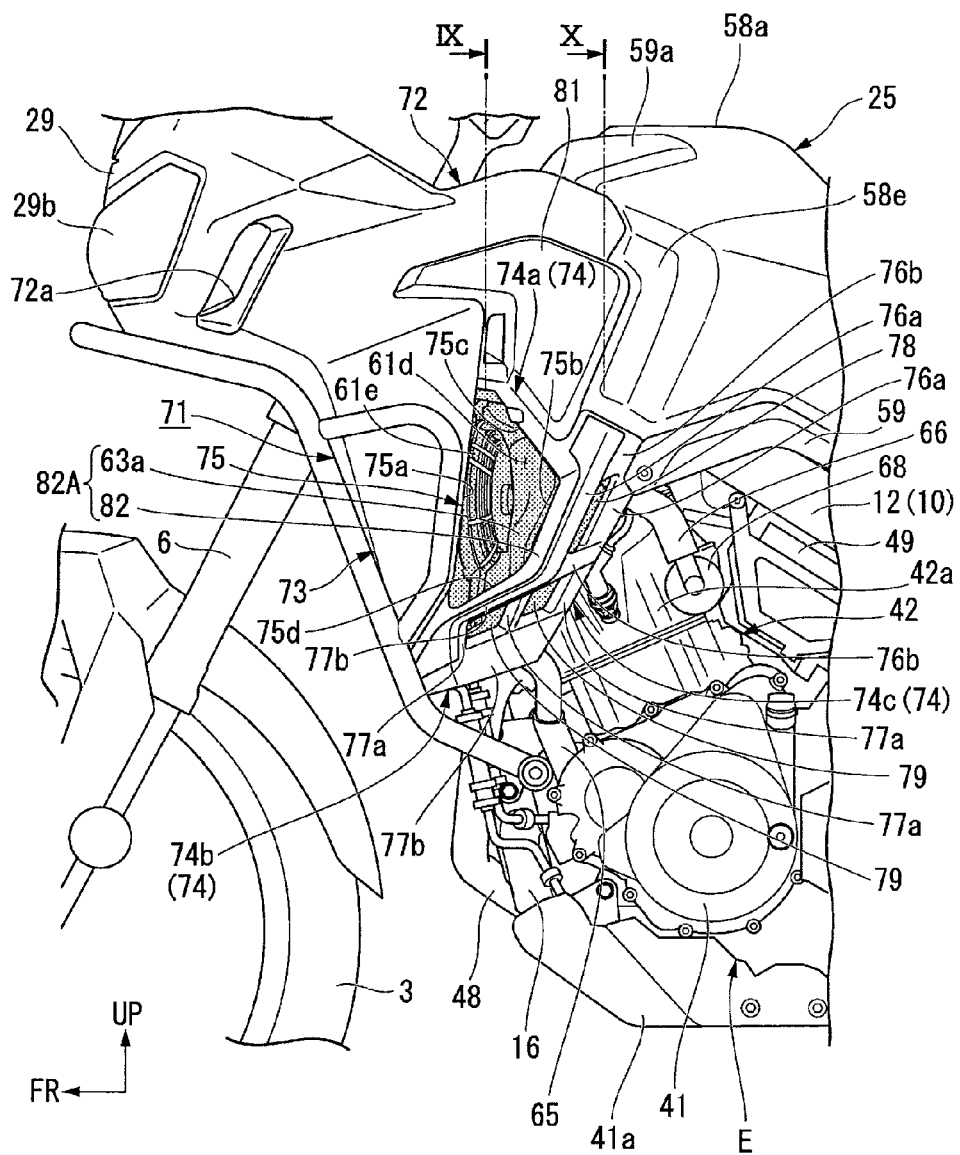
FIG. 6 is a left side view of the periphery of a radiator shroud of the motorcycle.

Referring also to FIGS. 6 and 9, the radiator air guide plate 63 is formed in the shape bulging toward the rear from the radiator core 61a. The radiator air guide plate 63 covers the radiator core 61a from behind so as to leave a space therebetween, a rear space 61d of the radiator core 61a opening outward in the vehicle width direction. The radiator air guide plate 63 forms an upstanding wall 63a that guides, to the outside in the vehicle width direction, outside air passing through the radiator core 61a into the rear space 61d, and an inner wall 63b that upstands forward on the inside in the vehicle width direction of a radiator fan 61e.

The upper tanks 61b of the left and right radiators 61 are connected by an upper communication hose 64 so as to communicate with each other, and the lower tanks 61c of the left and right radiators 61 are connected by a lower communication hose 65 so as to communicate with each other. In this embodiment, a cooling-water inflow hose 66 is connected to the upper tank 61b of the left radiator 61, and a cooling-water outflow hose 67 is connected to the lower tank 61c of the right radiator 61. The cooling-water inflow hose 66 extends forwardly upwardly from a thermostat 68 disposed in the left rear of the cylinder head 42a to the upper tank 61b of the left radiator 61. The cooling-water outflow hose 67 extends rearwardly downwardly from the lower tank 61c of the right radiator 61 to a water pump (not shown) disposed on the lower right side of the crankcase 41.

In this embodiment, an air-cooled oil cooler 69 is disposed on the outside in the vehicle width direction forwardly of the left radiator core 61a. The oil cooler 69 is formed slimmer than the radiator 61 and disposed with the longitudinal axis thereof aligned with the vertical direction.

The radiator fans 61e are disposed on the rear surfaces of the radiator cores 61a of the left and right radiators 61. Each of the radiator fans 61e is an axial flow fan, which is disposed with the axis thereof aligned with the thickness direction (ventilation direction) of the radiator core 61a. The radiator fan 61e causes air passing through the radiator core 61a to flow into the rear space 61d. Due to the above-described inclined arrangement, the thickness direction (ventilation direction) of the radiator core 61a (radiator 61) is inclined so as to be positioned on the outer side in the vehicle width direction toward the rear in the vehicle longitudinal direction. In accordance with this inclination, the axial direction of the radiator fan 61e is also inclined so as to be positioned on the outer side in the vehicle width direction toward the rear in the vehicle longitudinal direction. Thus, the radiator fan 61e causes the air passing through the radiator core 61a to flow rearwardly and to the outside in the vehicle width direction.

The radiator fan 61e is disposed within the rear space 61d of the radiator core 61a and is covered with the radiator air guide plate 63 from the inside in the vehicle width direction and behind. The radiator fan 61e is exposed lateral to the vehicle through a portion opening outwardly in the vehicle width direction of the radiator air guide plate 63 and an exhaust port 75 of the radiator shroud 71. The air caused to flow rearwardly and to the outside in the vehicle width direction by the radiator fan 61e is guided to the outside in the vehicle width direction along a partition wall 82A that includes the upstanding wall 63a of the radiator air guide plate 63 and an inner wall 82 of the radiator shroud 71, and discharged to the outside in the vehicle width direction through the exhaust port 75 of the radiator shroud 71.

Referring to FIG. 6, the left and right radiator shrouds 71 are provided on either side of a lower portion of the front cowl 29, for covering the left and right radiators 61, the cylinder head 42a located at the rear of the radiators 61, etc. from the outside in the vehicle width direction. The radiator shroud 71, in a side view, is provided so as to bulge rearwardly and downwardly from outside the lower portion of the front cowl 29 and in generally approximately the shape of an inverted triangle.

The radiator shroud 71 has a cowl side portion 72 that laterally covers a range from outside the lower portion of the front cowl 29 to the outside of a front end of the fuel tank 25; a front shroud 73 that extends downwardly from a front portion of the cowl side portion 72 to laterally cover the radiator 61; and a rear shroud 74 that is coupled to the lower side of a rear portion of the cowl side portion 72 and the rear of the front shroud 73.

An intake port 72a opening forward is provided at a front end of the cowl side portion 72. The intake port 72a supplies travelling air to the intake duct 53 of the air cleaner 51 facing into the cowl side portion 72. The front shroud 73 is integrally provided on the lower front portion of the cowl side portion 72.

The rear shroud 74 forms the exhaust port 75 at the rear of a rear edge of the front shroud 73, the exhaust port 75 discharging the outside air passing through the radiator 61 to the outside in the vehicle width direction. The rear shroud 74 also forms a plurality of small openings 78 and 79 around the exhaust port 75. The rear shroud 74 conceals rubber pipes of a radiator hose, etc. behind the wall portion except the small openings 78 and 79 while making metal components of the cylinder head 42a, etc. covered by the rear shroud 74 itself visible through the small openings 78 and 79.

The exhaust port 75, in a side view, has a front side 75a that is formed by the rear edge of the front shroud 73 and slightly inclined so as to be positioned rearwardly toward the upper side; a rear side 75b that is provided at the rear of the front side 75a so as to be inclined more rearward than the front side 75a; an upper side 75c that extends between upper ends of the front and rear sides 75a and 75b and is provided so as to be inclined rearward and downward; and a lower side 75d that extends between lower ends of the front and rear sides 75a and 75b and is provided so as to be inclined rearward and upward.

The rear shroud 74 has an upper frame 74a that conforms to the upper side 75c of the exhaust port 75, and a lower frame 74b that conforms to the lower side 75d, front ends of the upper and lower frames 74a and 74b being coupled to the front shroud 73 from behind. The rear shroud 74 also has a rear frame 74c, which is located between rear ends of the upper and lower frames 74a and 74b and conforms to the lower side 75b of the exhaust port 75.

In the rear frame 74c, a small slit-shaped opening 78 conforming to the rear side 75b is formed by two, front and rear vertical walls 76a conforming to the rear side 75b, and two, upper and rear horizontal walls 76b inclined upwardly toward the rear in the same manner as the lower side 75d.

In the lower frame 74b, two small openings 79 of parallelogram shape conforming to the lower side 75d are formed by two, upper and lower horizontal walls 77b conforming to the lower side 75d, and three, front and rear vertical walls 77a inclined rearwardly in the same manner as the rear side 75b. The horizontal wall 77b of the lower frame 74b below the small openings 79 is vertically wider than the other horizontal wall 77b and the vertical walls 77a. An outside portion of the lower communication hose 65 allowing communication between the lower tanks 61c of the left and right radiators 61 is disposed inside in the vehicle width direction of the horizontal wall 77b (see FIGS. 7 and 9). Thus, the outside portion of the lower communication hose 65 is covered with the horizontal wall 77b from the outside in the vehicle width direction.

A pad portion 81 having a rearwardly-protruding V shape in a side view is provided at an upper portion of the radiator shroud 71. At the rear of the pad portion 81, a rear portion of the radiator shroud 71 is cut away, and a bulge portion 58e protruding further outwardly in the vehicle width direction from the overhang portion 58c of the fuel tank 25 is provided so as to align with the cut-away portion. The bulge portion 58e, in a side view, has a rearwardly-protruding V shape and forms the appearance integral with the radiator shroud 71. The bulge portions 58e increase the capacity of the fuel tank 25, and suppress the exposure of occupant's knees to wind by overhanging outward in the vehicle width direction at the front of the knee grip portions 58d. While each of the bulge portions 58e serves as the outermost portion of the fuel tank 25 which overhangs most outward in the vehicle width direction, the pad portion 81 of the radiator shroud 71 is provided so as to overhang more outward in the vehicle width direction than the bulge portion 58e.

Each of the radiator shrouds 71 is an exterior component in which the cowl side portion 72 and the front shroud 73 having a relatively large amount of flat surface are integral to form a resin component and coating is applied thereto in the same manner as the front cowl 29. In the radiator shroud 71, the rear shroud 74 and the pad portion 81 are made of colored resin, and surface treatment, such as embossing, is further applied to the pad portion 81 so that scratches made by external contacts are made inconspicuous.

Referring to FIGS. 6 and 9, the radiator shroud 71 has an inner wall 82 that upstands inwardly in the vehicle width direction from the upper and lower sides 75c and 75d and the rear side 75b of the exhaust port 75. The inner wall 82 is provided so as to be continuous with the outside in the vehicle width direction of the upstanding wall 63a of the radiator air guide plate 63, and, in cooperation with the upstanding wall 63a, forms the partition wall 82A that separates the radiator 61 (radiator fan 61e) and the cylinder head 42a from each other. The partition wall 82A is inclined so as to be positioned rearwardly toward the outer side in the vehicle width direction, thereby guiding the exhaust air from the radiator fan 61e to the exhaust port 75 side (outside in the vehicle width direction) and preventing the flow of the hot exhaust air to the cylinder head 42a.

As described above, the motorcycle 1 according to the above-described embodiment is provided with the body frame 10 that includes the head pipe 11; the left and right main frames 12 that extend rearwardly from the head pipe 11; the left and right pivot frames 13 that are coupled to rear ends of the left and right main frames 12 and extend downwardly for swingably supporting the swing arm 4 supporting the rear wheel 5; the cross member 18 that couples the left and right pivot frames 13; and the left and right seat rails 14 that extend rearwardly from upper portions of the left and right pivot frames 13 for supporting the rider seat 26 and the pillion passenger seat 27. The saddle-ride type vehicle supports the shock absorber upper end coupling portion 18d on the cross member 18, and supports the engine E below the main frames 12 forwardly of the pivot frames 13. Each of the pivot frames 13 has the seat rail coupling portion 13b at an upper rear portion thereof while having the main flame coupling portion 13a at an upper front portion thereof. The cross member 18 is disposed closer to the seat rail coupling portions 13b between upper rear portions of the left and right pivot frames 13. The shock absorber upper end coupling portion 18d is provided at a leading end portion of the shock absorber support bracket 18c extending forwardly and downwardly from the cross member 18.

With this configuration, the shock absorber upper end coupling portion 18d is disposed forward of and below the cross member 18. Thus, while the rear shock absorber 31 is brought closer to the engine E located forward of the pivot frame 13, the upper height of the rear shock absorber 31 is reduced, thereby allowing mass concentration.

Furthermore, the cross member 18 supporting the shock absorber upper end coupling portion 18d while coupling the left and right pivot frames 13 is disposed close to the seat rail coupling portions 13b, thereby separating the cross member 18 from the main frame coupling portions 13a. Thus, the load transmitted from the front wheel 3 to the head pipe 11 is absorbed by the deformation of the main frames 12 and the large portions of the pivot frames 13 which serve as the main frame coupling portions 13a, thereby dispersing the stress caused by the load from the front wheel 3 and enabling the transmission of load to the rear wheel 5 to be minimized.

Further, the loads applied to the seat rails 14 from an occupant and on-vehicle objects are received by the cross member 18 spaced apart from the main frame coupling portions 13a, thereby making it less likely that loads on the seat rails 14 are transmitted to the main frames 12, and enabling the transmission of load to the front wheel 3 to be minimized.

Furthermore, in the above-described motorcycle, the body frame 10 in plan view is provided with the narrowed portion 10c between the maximum width portion 12c between the left and right main frames 12 and the maximum width portion 14c between the left and right seat rails 14, and the cross member 18 couples the left and right pivot frames 13 at the narrowed portion 10c.

With this configuration, at the narrowed portion 10c, the left and right pivot frames 13 are coupled by the cross member 18. Thus, the cross member 18 is shortened to minimize its deflection, thereby allowing an increase in the rigidity around the cross member 18. Especially since the load from the rear shock absorber 31 is received by the cross member 18 that is less likely to be deflected, it is possible to make the load from the rear shock absorber 31 less likely to be transmitted to the main frames 12. Moreover, the narrowed portion 10c of the body frame 10 is located forward of the seat rails 14, thereby allowing improved occupant comfort.

Moreover, in the above-described motorcycle, the cross member 18, in a side view, is disposed above the line segment 12d, the line segment 12d passing through the center of the main-frame width direction perpendicular to the longitudinal direction of the main frames 12.

With this configuration, the cross member 18 is disposed so as to avoid the center of the main-frame width direction in a side view, thereby allowing an improvement in the deformation of the main frame 12 and the main frame coupling portion 13a. Especially since the cross member 18 is disposed at a position above the center of the main-frame width direction, it is possible to make the lower portions of the main frames 12 likely to be deflected, and to excellently disperse the load of the engine E supported below the main frames 12.

Further, in the above-described motorcycle, the auxiliary machine arrangement box 28 is provided above the forwardly-inclined rear shock absorber 31 rearwardly of the cross member 18.

With this configuration, the space formed at the rear of the cross member 18 by inclining the rear shock absorber 31 forward can be effectively used as the auxiliary machine arrangement portion for arranging auxiliary machines, such as electric components.

Additionally, in the above-described motorcycle, each of the pivot frames 13 is provided with the opening portion 13c, the opening portion 13c being located forward of and below the cross member 18 and passing therethrough in the vehicle width direction, and the shock absorber upper end coupling portion 18d is disposed inside the opening portion 13c in a side view.

With this configuration, it is possible to provide access from the outside in the vehicle width direction to the shock absorber upper end coupling portion 18d through the opening portion 13c of the pivot frame 13, resulting in an improvement in the assemblability of the rear shock absorber 31. It is also possible to ensure the rigidity of the pivot frames 13 by disposing the cross member 18 close to the opening portions 13c.

It should be understood that the present invention is not limited to the foregoing embodiment and may include not only the configuration in which the upper end of the rear shock absorber is coupled to the cross member, but also configurations in which other elements of the rear suspension are coupled thereto depending on the form of the rear suspension or the like.

Examples of the saddle ride-type vehicle include general vehicles in which a rider sits astride a vehicle body, and include not only motorcycles (including motor-assisted bicycles and scooter-type vehicles), but also three-wheeled vehicles (including vehicles having one wheel in front and two in the rear, as well as vehicles having two wheels in front and one in the rear) or four-wheeled vehicles.

It should be also understood that the constitution according to the foregoing embodiment is only illustrative of the present invention, and various changes, such as replacement of the elements in the embodiment by known elements, may be made without departing from the scope of the present invention.

The invention claimed is:

1. A saddle-ride vehicle comprising
a body frame including:
   a head pipe;
   left and right main frames extending rearwardly from the head pipe;
   left and right pivot frames coupled to rear ends of the left and right main frames and extending downwardly for swingably supporting a swing arm, the swing arm supporting a rear wheel;
   a cross member for coupling the left and right pivot frames; and
   left and right seat rails extending rearwardly from upper portions of the left and right pivot frames for supporting seats;
the saddle-ride vehicle supporting a rear suspension upper support portion on the cross member and supporting an engine below the main frames forwardly of the pivot frames;
wherein each of the pivot frames has a seat rail coupling portion at an upper rear portion thereof while having a main frame coupling portion at an upper front portion thereof;
the cross member being disposed adjacent to the seat rail coupling portions between upper rear portions of the left and right pivot frames; and
the rear suspension upper support portion is provided at a leading end portion of a bracket extending forwardly and downwardly from the cross member.

2. The saddle-ride vehicle according to claim 1, wherein the body frame is provided with a narrowed portion between a maximum width portion between the left and right main frames and a maximum width portion between the left and right seat rails in a plan view, and
the cross member couples the left and right pivot frames at the narrowed portion.

3. The saddle-ride vehicle according to claim 1, wherein the cross member, in a side view, is disposed above a line segment, the line segment passing through the center of a main-frame width direction perpendicular to a longitudinal direction of the main frames.

4. The saddle-ride vehicle according claim 1, wherein an auxiliary machine arrangement portion is provided above a forwardly-inclined rear shock absorber rearwardly of the cross member.

5. The saddle-ride vehicle according to claim 1, wherein each of the pivot frames is provided with an opening portion, the opening portion being located forward of and below the cross member and passing therethrough in the vehicle width direction, and
in a side view, the rear suspension upper support portion is disposed inside the opening portion.

6. The saddle-ride vehicle according to claim 2, wherein the cross member, in a side view, is disposed above a line segment, the line segment passing through the center of a main-frame width direction perpendicular to a longitudinal direction of the main frames.

7. The saddle-ride vehicle according claim 2, wherein an auxiliary machine arrangement portion is provided above a forwardly-inclined rear shock absorber rearwardly of the cross member.

8. The saddle-ride vehicle according to claim 3, wherein an auxiliary machine arrangement portion is provided above a forwardly-inclined rear shock absorber rearwardly of the cross member.

9. The saddle-ride vehicle according to claim 2, wherein each of the pivot frames is provided with an opening portion, the opening portion being located forward of and below the cross member and passing therethrough in the vehicle width direction, and
in a side view, the rear suspension upper support portion is disposed inside the opening portion.

10. The saddle-ride vehicle according to claim 3, wherein each of the pivot frames is provided with an opening portion, the opening portion being located forward of and below the cross member and passing therethrough in the vehicle width direction, and
in a side view, the rear suspension upper support portion is disposed inside the opening portion.

11. The saddle-ride vehicle according to claim 4, wherein each of the pivot frames is provided with an opening portion, the opening portion being located forward of and below the cross member and passing therethrough in the vehicle width direction, and
in a side view, the rear suspension upper support portion is disposed inside the opening portion.

12. A rear suspension for a saddle-ride vehicle comprising a body frame including:
a head pipe;
left and right main frames extending rearwardly from the head pipe;
a swing arm;
left and right pivot frames coupled to rear ends of the left and right main frames and extending downwardly for swingably supporting the swing arm;
a cross member for coupling the left and right pivot frames; and
left and right seat rails extending rearwardly from upper portions of the left and right pivot frames for supporting seats;
a rear suspension upper support portion mounted on the cross member for supporting an engine below the main frames forwardly of the pivot frames;
a seat rail coupling portion at an upper rear portion of each of the pivot frames with a main frame coupling portion at an upper front portion of each of the pivot frames;
the cross member being disposed adjacent to the seat rail coupling portions between upper rear portions of the left and right pivot frames; and
the rear suspension upper support portion is provided at a leading end portion of a bracket extending forwardly and downwardly from the cross member.

13. The saddle-ride vehicle according to claim 12, wherein the body frame is provided with a narrowed portion between a maximum width portion between the left and right main frames and a maximum width portion between the left and right seat rails in a plan view, and
the cross member couples the left and right pivot frames at the narrowed portion.

14. The saddle-ride vehicle according to claim 12, wherein the cross member, in a side view, is disposed above a line segment, the line segment passing through the center of a main-frame width direction perpendicular to a longitudinal direction of the main frames.

15. The saddle-ride vehicle according to claim 13, wherein the cross member, in a side view, is disposed above a line segment, the line segment passing through the center of a main-frame width direction perpendicular to a longitudinal direction of the main frames.

16. The saddle-ride vehicle according claim 12, wherein an auxiliary machine arrangement portion is provided above a forwardly-inclined rear shock absorber rearwardly of the cross member.

17. The saddle-ride vehicle according claim 13, wherein an auxiliary machine arrangement portion is provided above a forwardly-inclined rear shock absorber rearwardly of the cross member.

18. The saddle-ride vehicle according claim 14, wherein an auxiliary machine arrangement portion is provided above a forwardly-inclined rear shock absorber rearwardly of the cross member.

19. The saddle-ride vehicle according to claim 12, wherein each of the pivot frames is provided with an opening portion, the opening portion being located forward of and below the cross member and passing therethrough in the vehicle width direction, and
in a side view, the rear suspension upper support portion is disposed inside the opening portion.

20. The saddle-ride vehicle according to claim 13, wherein each of the pivot frames is provided with an opening portion, the opening portion being located forward of and below the cross member and passing therethrough in the vehicle width direction, and
in a side view, the rear suspension upper support portion is disposed inside the opening portion.

* * * * *